(No Model.)  2 Sheets—Sheet 1.

H. REYNOLDS.
MACHINE FOR FINISHING BOLT HEADS AND NUTS.

No. 300,641.  Patented June 17, 1884.

Witnesses.
J. H. Shumway
Jos. C. Earle

Henry Reynolds
Inventor
By atty
John C. Earle (No Model.) 2 Sheets—Sheet 2.

H. REYNOLDS.
MACHINE FOR FINISHING BOLT HEADS AND NUTS.

No. 300,641. Patented June 17, 1884.

Witnesses:
J. N. Shumway
Jos. C. Earle

Henry Reynolds
Inventor
By Atty,

UNITED STATES PATENT OFFICE.

HENRY REYNOLDS, OF NEW HAVEN, CONNECTICUT.

MACHINE FOR FINISHING BOLT-HEADS AND NUTS.

SPECIFICATION forming part of Letters Patent No. 300,641, dated June 17, 1884.

Application filed February 2, 1884. (No model.)

*To all whom it may concern:*

Be it known that I, HENRY REYNOLDS, of New Haven, in the county of New Haven and State of Connecticut, have invented a new Improvement in Machines for Finishing Nuts and Bolt-Heads; and I do hereby declare the following, when taken in connection with accompanying drawings and the letters of reference marked thereon, to be a full, clear, and exact description of the same, and which said drawings constitute part of this specification, and represent, in—

Figure 4:
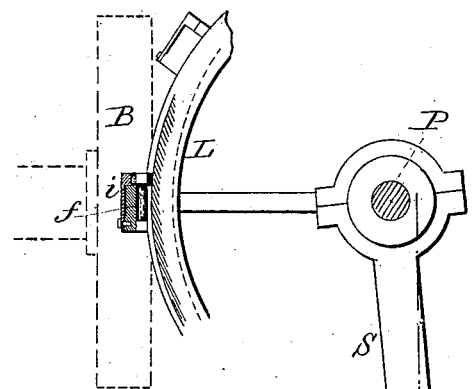
Figure 5:
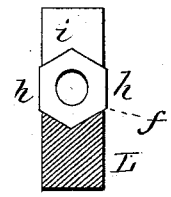
Figure 6:
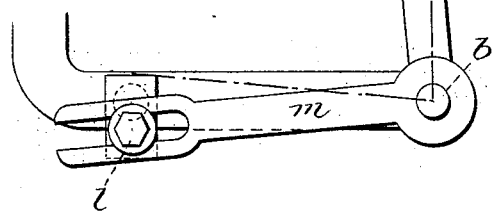
Figure 1:
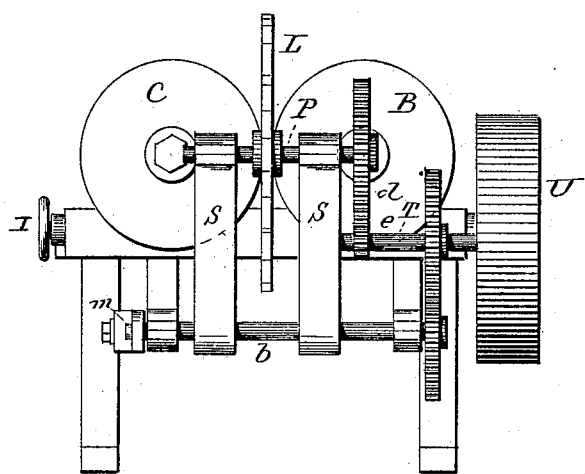
Figure 2:
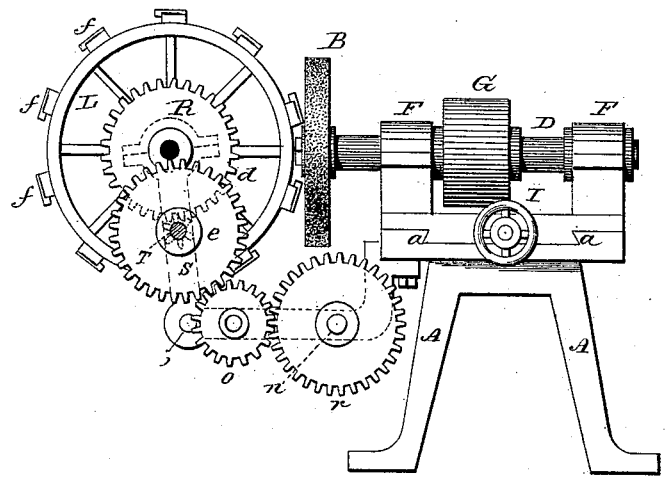
Figure 3:
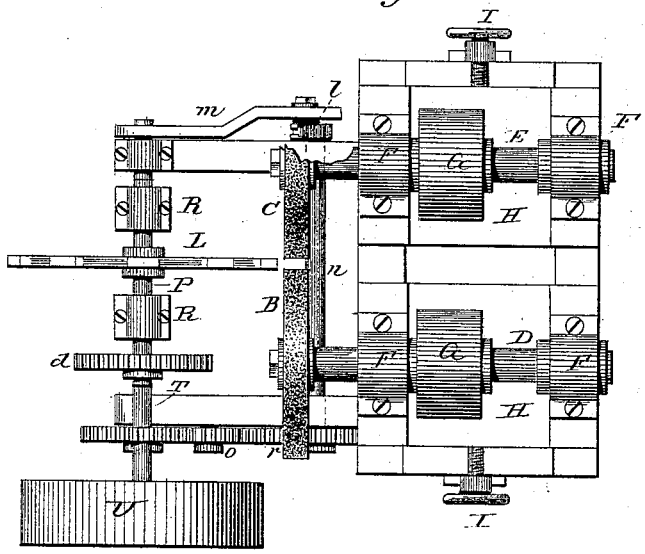

Figure 1, a front view; Fig. 2, an end view from the right; Fig. 3, a top view; Fig. 4, detached parts to illustrate the swinging or transverse movement of the carrying-wheel; Fig. 5, a section through the rim of the wheel, showing the seat for the nut or head of the bolt; Fig. 6, a modification.

This invention relates to a machine for dressing or finishing the sides of polygonally-shaped nuts or bolt-heads, the object of the invention being to present opposite sides of a bolt-head between a pair of grinding-wheels, whereby the said opposite sides will be simultaneously finished; and the invention consists in a pair of grinding-wheels arranged with their axes parallel to each other, and both wheels in substantially the same plane, combined with a carrying-wheel arranged on an axis at right angles to the axis of the grinding-wheels, and so as to revolve in a plane passing between the said grinding-wheels, the said carrying-wheel constructed to receive and hold the nuts or bolt-heads, so that the opposite faces of the polygonally-shaped nut or bolt will be presented by the carrying-wheel between the faces of the grinding-wheels, and thereby ground or polished; also, in imparting to the said carrying-wheel a transverse movement, whereby the whole surface of the grinding-wheels is caused to act upon the faces of the bolt-heads or nuts being polished, and as more fully hereinafter described.

A represents the supporting-frame; B C, the two grinding-wheels, arranged, respectively, on parallel shafts D E in bearings F, and to which power is applied through a pulley, G, or otherwise. The bearings F F are preferably arranged upon independent carriages H, adjustable in guides *a a* toward or from each other by means of leading-screws I, and so that the faces of the wheels may be set nearer to or farther from each other, as occasion requires. The grinding-wheels stand in substantially the same plane, and are made so as to present any suitable grinding or polishing surface.

L is the carrying-wheel, arranged upon a shaft, P, said shaft supported in bearings R at right angles to the axis of the grinding-wheels, the carrying-wheel L in a plane passing between the two grinding-wheels. The bearings R are preferably made in a frame, S, hung below, as at *b*, so that the shaft with the wheel may be moved transversely toward or from the grinding-wheel. As a slow revolution is required for the carrying-wheel, I apply a gear, *d*, to the carrying-wheel, and into this gear *d* a pinion, *e*, on a shaft, T, works. This shaft T is the driving-shaft, and power is applied to it through a pulley, U, thereon.

On the periphery of the wheel L seats *f* are formed to receive the bolt or nut. These seats are best formed by making a hole through the seat on a line tangent to the wheel, as seen in Fig. 4, to receive the body of the bolt. At the end of the seats a recess is made corresponding to the sides of the head, as seen in Fig. 5, where the shape is represented as hexagonal, and so that opposite sides *h h* will stand parallel with the plane of wheel. Then upon the top or sides opposite the recess in the seat a spring, *i*, its nose corresponding to that side of the head or nut, is caused to bear upon those sides, as seen in Figs. 4 and 5, the power of the spring being sufficient to hold the bolt or nut in its seat, and so held the wheel, revolving, presents the opposite faces *h h* to the grinding-wheels, as seen in Fig. 4. The grinding-wheels should revolve in the direction opposite to that of the carrying-wheel, and so that the force of the grinding-wheels will tend to hold the nut or bolt in its seat. There being several seats *f* on the periphery of the wheel, the wheel may revolve constantly, the attendant introducing the nut or bolt to be finished—say at the top— removing the finished pieces as they come to that position, and introducing new ones in their place.

In order that the surfaces being ground may not traverse in the same path, and thereby unevenly wear the grinding-wheels, I impart a transverse or forward-and-back movement to the wheel L by means of a revolving crank, *l*, acting through an arm, *m*, fixed to the frame S. The revolution of this crank imparts a vibratory movement to the arm *m*, which is transmitted to the frame S, thereby causing it to move toward and from the grinding-wheels, as indicated in broken lines, Fig. 4. This crank is on the end of a shaft, *n*, which receives its rotation from the shaft T through gear *o*. The swinging movement of the carrying-wheel will be slow, but sufficient to cause the surfaces being ground to pass back and forth entirely across the face of the grinding-wheels, and thereby cause an even wear upon them.

It will be understood that the recesses or bearings for the nuts or bolt-heads, as also the shape of the spring, are to be made to correspond to opposite points of the nut or head, and so that opposite surfaces will be presented to the respective grinding-wheels. In case of machines for polishing nuts only, it will not be required that the seat shall have the hole through it shown for the purpose of receiving the body of the bolt.

Instead of arranging the nut or bolt with its axis tangent to the wheel, it may be arranged radially, as seen in Fig. 6; but I prefer the seats first described as being the best adapted to securely hold and support the head or nut being operated upon.

While I have described my invention as for grinding or polishing the faces of nuts or heads of bolts, it may be used for other purposes, or grinding articles of other or analogous shapes. I therefore by the term "nuts" or "heads" of bolts wish to be understood as embracing any analogous use of the machine—that is, I do not wish to be understood as confining my invention to the grinding or finishing of nuts or heads of bolts.

I am aware that two grinding-wheels have been arranged upon axes parallel to each other, and so as to revolve in the same plane, whereby articles passing between the surfaces of said grinding-wheels will be operated upon, and therefore do not claim, broadly, such an arrangement of grinding-wheels.

I claim—

1. The combination of two grinding-wheels arranged upon axes parallel to each other, so as to revolve in substantially the same plane, a carrying-wheel arranged to revolve in a plane between the faces of said grinding-wheels and upon an axis at right angles to the axes of said grinding-wheels, said carrying-wheel provided with seats to receive the bolts or nuts, so as to present opposite sides of said nuts or heads of the bolts between the said grinding-wheels, substantially as described.

2. The combination of two grinding-wheels arranged upon axes parallel to each other, so as to revolve in substantially the same plane, and a carrying-wheel arranged to revolve in a plane between the faces of said grinding-wheels and upon an axis at right angles to the axes of said grinding-wheels, said carrying-wheel provided with seats to receive the bolts or nuts, so as to present opposite sides of said nuts or heads of the bolts between the said grinding-wheels, with mechanism, substantially such as described, to impart to said carrying-wheel a transverse movement, substantially as specified.

3. The combination of the two grinding-wheels B C, arranged to revolve in the same plane, the carrying-wheel L, arranged to revolve in a plane between said grinding-wheels, said carrying-wheel provided with seats *f*, having a recess upon which the nut or head of the bolt may rest, and a spring, *i*, to bear upon the nut or bolt upon the side opposite the bearing upon the seat, substantially as described.

HENRY REYNOLDS.

Witnesses:
JOHN E. EARLE,
JOS. C. EARLE.